(12) United States Patent
Cianciotto et al.

(10) Patent No.: US 7,443,591 B1
(45) Date of Patent: Oct. 28, 2008

(54) HOMOGENIZING OPTICAL BEAM COMBINER

(75) Inventors: Frank T. Cianciotto, Tehachapi, CA (US); George H. Butler, III, Mesa, AZ (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 11/830,706

(22) Filed: Jul. 30, 2007

Related U.S. Application Data

(63) Continuation-in-part of application No. 11/670,320, filed on Feb. 1, 2007, now Pat. No. 7,386,214.

(51) Int. Cl.
*G02B 27/10* (2006.01)
*G02B 6/00* (2006.01)
*G02B 6/42* (2006.01)

(52) U.S. Cl. .................. 359/618; 385/45; 385/133; 362/551; 353/94

(58) Field of Classification Search ............... 359/618, 359/629, 598, 599, 726; 362/554, 555, 560, 362/26, 268, 551, 296, 298, 235, 305, 577; 385/27, 28, 31, 32, 43, 45, 46, 129, 133, 385/146, 147; 353/12, 20, 94, 97, 99
See application file for complete search history.

(56) References Cited

U.S. PATENT DOCUMENTS

| | | |
|---|---|---|
| 3,825,741 A | 7/1974 | Morton et al. |
| 4,632,513 A | 12/1986 | Stowe |
| 4,964,692 A | 10/1990 | Prescott |
| 5,054,869 A | 10/1991 | Doyle |
| 5,054,874 A | 10/1991 | Hill |
| 5,375,185 A | 12/1994 | Hermsen |
| 5,553,183 A | 9/1996 | Bechamps |
| 5,604,837 A | 2/1997 | Tanaka |
| 5,701,191 A | 12/1997 | Iwasaki |
| 5,727,108 A | 3/1998 | Hed |
| 5,803,575 A | 9/1998 | Ansems et al. |
| 5,828,505 A | 10/1998 | Farmiga |
| 6,038,361 A | 3/2000 | Yoshikawa et al. |
| 6,104,857 A | 8/2000 | Ishiharadsa et al. |
| 6,125,228 A | 9/2000 | Gong |
| 6,149,289 A | 11/2000 | Kuramitsu et al. |

(Continued)

FOREIGN PATENT DOCUMENTS

JP    11-017969    1/1999

(Continued)

*Primary Examiner*—Loha Ben
(74) *Attorney, Agent, or Firm*—MacPherson Kwok Chen & Heid LLP; Greg J. Michelson

(57) ABSTRACT

An optical homogenizing and combining apparatus, comprises a one piece, hollow, tubular body having a first input leg, a second input leg and an output leg, each leg having a polygonal cross-section and highly reflective interior surfaces in accordance with an embodiment. The body has a shape corresponding to first and second bent tubes, the tubes being truncated along a plane and joined at a junction lying in the plane. The a first end of the first tube defines the first input leg, a first end of the second tube defines the second input leg, and a second end of the first tube and a second end of the second tube define the output leg.

20 Claims, 9 Drawing Sheets

U.S. PATENT DOCUMENTS

| | | |
|---|---|---|
| 6,324,330 B1 | 11/2001 | Stites |
| 6,332,688 B1 | 12/2001 | Magarill |
| 6,366,308 B1 | 4/2002 | Hawryluk et al. |
| 6,513,937 B1 | 2/2003 | Dehmlow |
| 6,771,870 B2 | 8/2004 | Strobl et al. |
| 6,792,190 B2 | 9/2004 | Xin et al. |
| 6,801,701 B1 | 10/2004 | Montgomery et al. |
| 6,857,764 B2 | 2/2005 | Kohno |
| 6,986,591 B2 | 1/2006 | Pate |
| 7,113,684 B1 * | 9/2006 | Cianciotto et al. .......... 385/133 |
| 7,155,106 B2 | 12/2006 | Cianciotto et al. |
| 7,171,097 B2 | 1/2007 | Cianciotto et al. |
| 7,173,775 B2 * | 2/2007 | Cianciotto et al. .......... 359/726 |
| 7,295,385 B2 * | 11/2007 | Cianciotto et al. .......... 359/726 |
| 2001/0005222 A1 | 6/2001 | Yamaguchi |
| 2004/0137089 A1 | 7/2004 | Dinan |
| 2004/0137189 A1 | 7/2004 | Tellini et al. |
| 2005/0084210 A1 | 4/2005 | Cha |
| 2005/0112639 A1 | 5/2005 | Wang et al. |
| 2005/0162853 A1 | 7/2005 | Jain |
| 2005/0237621 A1 | 10/2005 | Peterson |
| 2005/0270652 A1 | 12/2005 | Voss et al. |
| 2006/0256445 A1 | 11/2006 | Zueger |
| 2006/0256449 A1 | 11/2006 | Cianciotto et al. |

FOREIGN PATENT DOCUMENTS

| | | |
|---|---|---|
| JP | 11-250227 | 9/1999 |

* cited by examiner

HOMOGENIZING OPTICAL BEAM COMBINER

CROSS-REFERENCE TO RELATED APPLICATIONS

This continuation-in-part patent application is related to and claims priority to U.S. patent application Ser. No. 11/670,320, filed Feb. 1, 2007, now U.S. Pat. No. 7,386,214, which is incorporated herein by reference in its entirety.

TECHNICAL FIELD

The present disclosure relates generally to optical guides, and more particularly to a homogenizing optical beam combiner.

BACKGROUND

Optical devices that combine or homogenize an incoming light beam are known, yet such devices typically include heavy, expensive, and delicate components that may limit the application of these useful techniques. Previous attempts have included the use of a hex-shaped glass rod with an exterior cladding configured to provide reflection of light within the glass rod. Such a glass rod is typically very expensive to produce, extremely fragile, and has the disadvantage that light may leak out of the glass rod if the exterior cladding is damaged. When an input beam is non-uniform, additional components are typically required to produce a uniform intensity distribution. Such additional components contribute to the increased cost, weight, and complexity of the optical system since these additional components may be subject to misalignment or may be more susceptible to optical contamination. Further, the use of multiple optical elements may lead to substantial intensity losses as a light beam propagates through the multiple optical elements. Thus, there remains a need for an apparatus and method to provide light combining and homogenization in a rugged, compact, and low cost manner.

SUMMARY

Systems and methods are disclosed herein to provide an optical beam combiner. For example, in accordance with an embodiment, an optical homogenizing and combining apparatus, comprises a one piece, hollow, tubular body having a first input leg, a second input leg and an output leg, each leg having a polygonal cross-section and highly reflective interior surfaces. The body has a shape corresponding to first and second bent tubes, the tubes being truncated along a plane and joined at a junction lying in the plane. A first end of the first tube defines the first input leg, a first end of the second tube defines the second input leg, and a second end of the first tube and a second end of the second tube define the output leg.

In accordance with another embodiment, a method of forming a light combining and homogenizing apparatus comprises forming a mandrel, wherein the mandrel has a shape corresponding to the shape of two symmetrical, bent, truncated polygonal rods joined at a planar truncation face, depositing a body on lateral surfaces of the mandrel, and removing the mandrel from an interior of the body.

In accordance with another embodiment, a light combining and homogenizing apparatus comprises a first curved, hex-shaped input leg having a first input opening at one end and a first junction edge at a second end, a second curved, hex-shaped input leg having a second input opening at one end and a second junction edge at a second end, wherein the first and second input legs are joined at the first and second junction edges.

The apparatus also comprises a hex-shaped output leg connected to the first and second input legs. The first input leg, the second input leg and the output leg have highly reflective interior surfaces. A first input beam received at the first input opening and a second input beam received at the second input opening are homogenized and combined into an output beam emitted from the output opening and having an intensity equal to about the sum of intensities of the first and second input beams and having a top hat profile.

The scope of the disclosure is defined by the claims, which are incorporated into this section by reference. A more complete understanding of embodiments will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIG. 1 illustrates a light homogenizing and combining apparatus, in accordance with an embodiment of the present invention.

Embodiments and their advantages are best understood by referring to the detailed description that follows. It should be appreciated that like reference numerals are used to identify like elements illustrated in one or more of the figures.

DETAILED DESCRIPTION

Figure 1A:
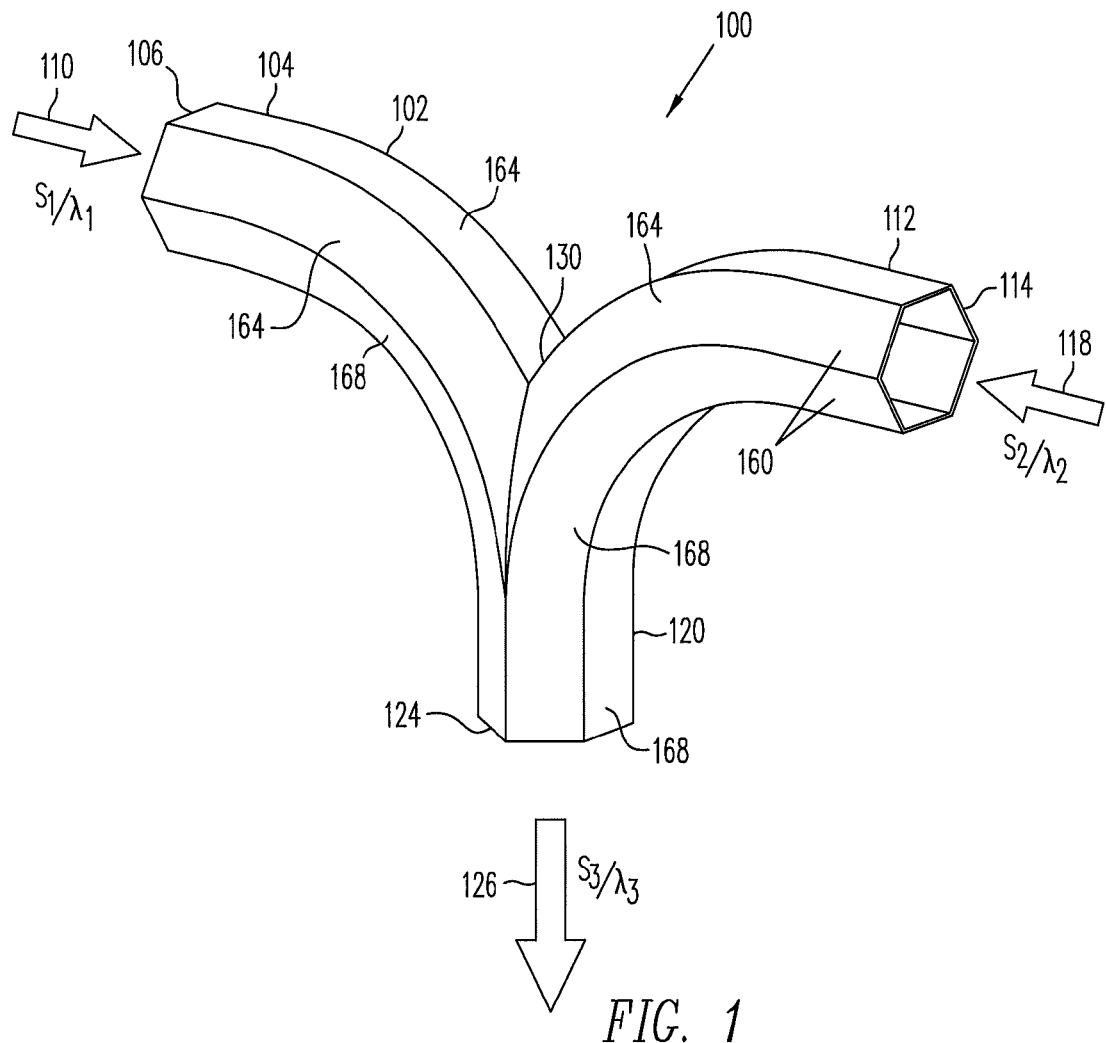
FIG. 1A illustrates an overhead view of the light homogenizing and combining apparatus of FIG. 1.
Figure 1A:
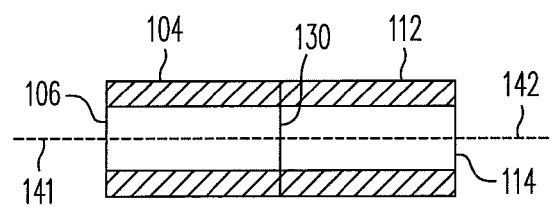

FIG. 1 shows a side view of a light homogenizing and combining apparatus (LHCA) 100, in accordance with an embodiment of the present invention. LHCA 100 may comprise a one-piece, closed, hollow tubular member, or tubular body 102 having legs 104, 112 and 120. Each leg 104, 112 and 120 may have a polygonal cross-section, for example hexagonal, and have highly reflective interior surfaces.

The body 102 may include a first leg 104 or first input leg having an opening 106 configured to receive a first Gaussian light beam 110 of a first intensity and spectral content $S_1$ or color $\lambda_1$. The light beam 110 is reflected within first leg 104 to provide a first leg output beam 110' (FIG. 4) that is at least partially homogenized.

Similarly, body 102 may also include a second leg 112, or second input leg, having an opening 114 configured to receive a second Gaussian light beam 118 of a second intensity and spectral content $S_2$ or color $\lambda_2$. Light beam 118 may be reflected within second leg 112 to produce a second leg output beam 118' that is at least partially homogenized. While two input legs are shown, this is not considered limiting.

Body 102 may also include a third leg 120, or output leg with an output opening 124. The input legs 104, 112 and the output leg 120 are joined so that substantially all of the energy of the first leg output beam 110' (FIG. 4) and the second leg output beam 118' (FIG. 4) combine at a junction 130, reflect within the third leg 120, resulting in a third leg output beam 126 emitted from the third leg second end 124.

The third leg output beam 126 may have a third intensity and spectral content $S_3$ or color $\lambda_3$ that is a combination of the first intensity and spectral content $S_1$ and the second intensity and spectral content $S_2$. The third leg output beam 126 may have a homogenized top hat profile. In one alternative, a third leg output beam from a first LHCA 100 may be applied as an input beam to a second LHCA 100, so that three or more Gaussian light beams may be combined in a sequential or serial manner.

While the LHCA 100 may have a hexagonal cross-section, other geometrical cross-sections may also be used including triangular, square, pentagonal, heptagonal, and octagonal, for example. Further, first leg 104, second leg 112, and third leg 120 may each have the same or a different geometrical cross-sections.

In this disclosure, the color of light refers to the wavelength or frequency distribution, band, or spectral content of the light and may include both visible and invisible wavelengths. While a particular spectra or wavelength is described for each beam, it is understood that the color of a beam refers equally to its frequency components and associated intensity for each component, and may also be referred to as frequency profile, spectral content, or spectral power distribution (SPD) for the associated beam.

In an example embodiment, the LHCA 100 has a shape corresponding to truncated, bent tubes joined along a junction to define an enclosed LCHA. The bent tubes may have a polygonal cross-section, for example hexagonal. The tubes may be truncated along a plane parallel with the axis 144 (FIG. 2) of the output leg 124. The tubes are truncated such that the edges of one of the bent tubes along the plane of truncation match up with the edges of the other bent tube along the corresponding plane of truncation so that the two truncated, bent tube shapes form a closed LCHA with multiple input openings 106, 112 and an output opening 124 when joined.

The LCHA 100 may include a plurality of side members 160. The side members may include junction side panels 164 and continuous side panels. The junction panels 164 have junction edges 165 that all lie in a common plane. The plane is parallel to the axis 144 of the output leg 120. The joined junction edges 165 define the junction 130.

First ends of some of the continuous panels 168 together with first ends of some of the junction panels 164 to define the first input tube 104 and the first input opening 106. First ends of other continuous panels 168 together with first ends of other junction panels 164 define the second input leg 112 and the second input opening 114. Second ends of all of the continuous panels 168 may be joined together to define the output leg 120 and output opening 124.

Figure 2:
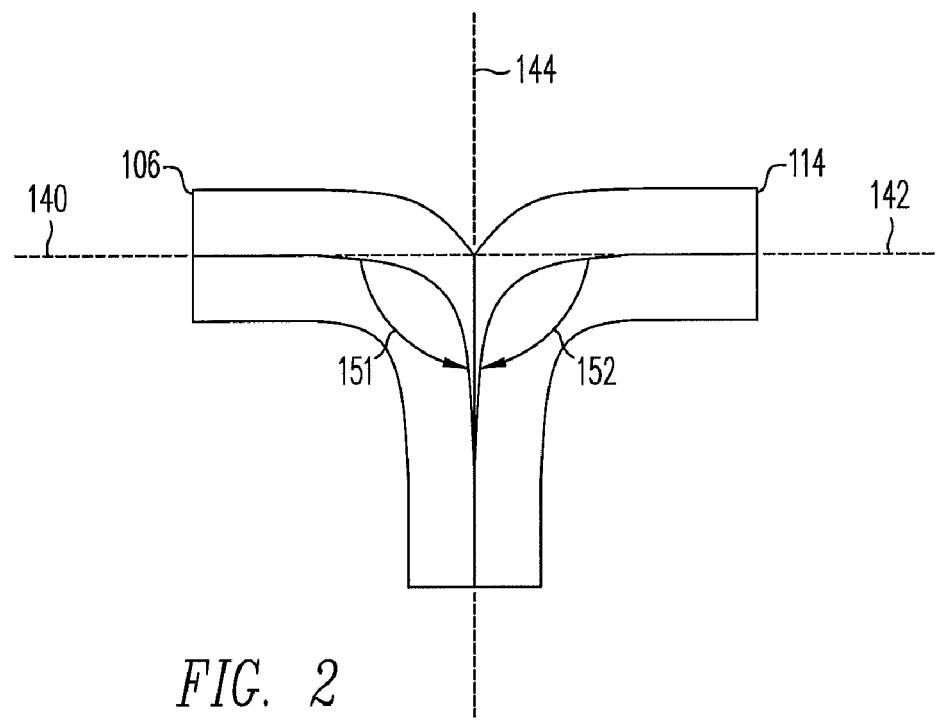
FIG. 2 illustrates a side view of the light homogenizing and combining apparatus of FIG. 1.

FIG. 2 illustrates a side view of the LHCA 100 of FIG. 1. The opening 106 may be arranged along a central, longitudinal axis 140 normal or perpendicular to the planar cross-section of the opening 106. The opening 114 may be arranged along a central, longitudinal axis 142. The second end 124 of the third leg 120 may be arranged along a central, longitudinal axis 144. The axes 140, 142 may be arranged at angles 151, 152 with respect to the axis 144.

In one embodiment, the angles 151, 152 may be the same angles. In other embodiments, the axes 140, 142 may be at different angles with respect to the axis 144. The angles 151, 152 may be, for example, right angles. In other embodiments, the central, longitudinal axes 140, 142 may be arranged at angles 151, 152 from 90 degrees to 180 degrees up to right angles with respect to the central, longitudinal axis 144.

Figure 3:
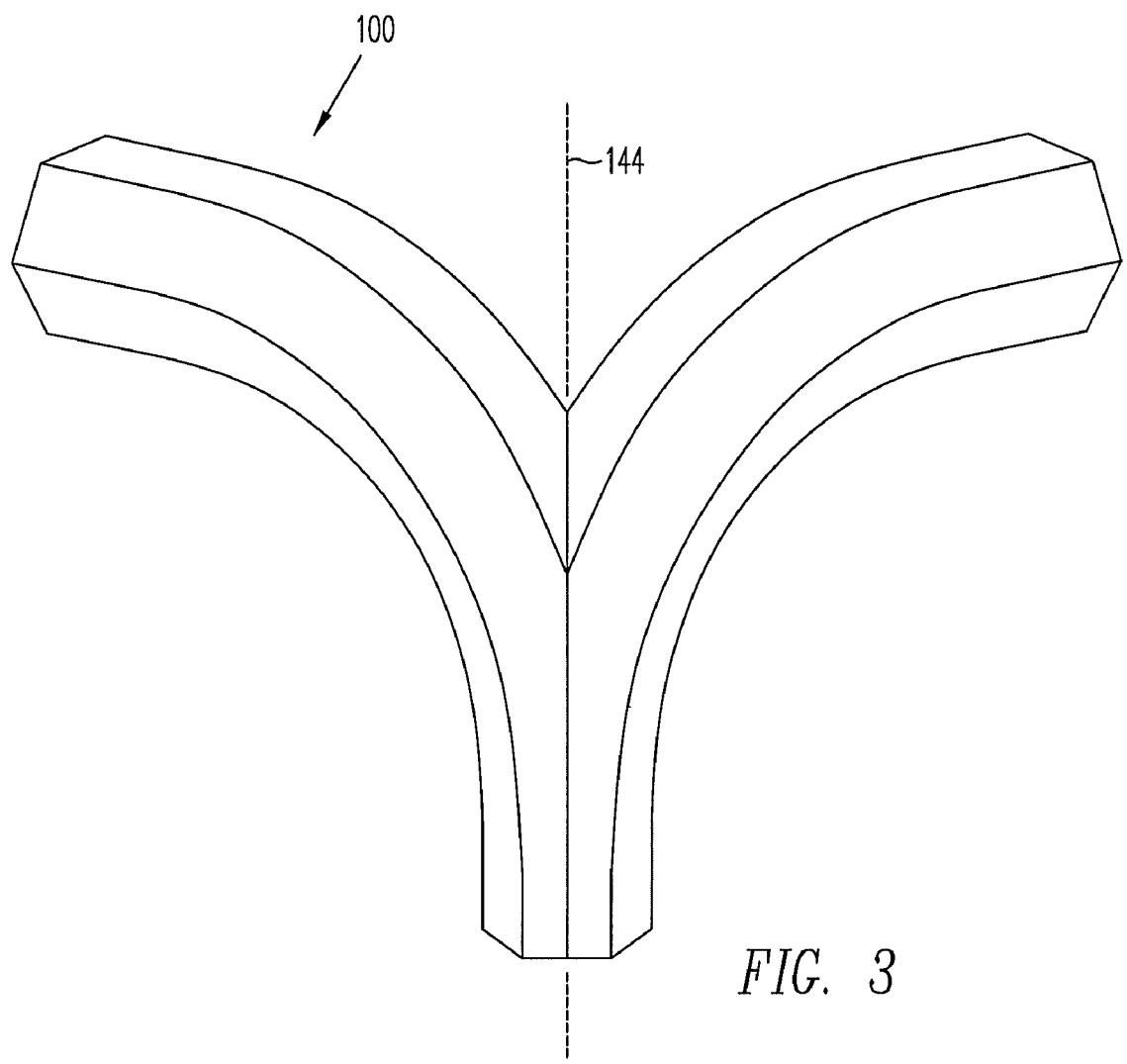
FIG. 3 illustrates a light homogenizing and combining apparatus in accordance with an embodiment of the present invention.

In one embodiment, the axes 140, 142 may be parallel and co-linear when viewed from a perspective normal to the axis 144, as shown, for example in FIG. 1a. In other embodiments, the axes 140, 142 may be arranged with an angle 145 from zero to 180 degrees between the axes 140, 142 when viewed from a perspective normal to the axis 144, for example 120 degrees, as shown for example in FIGS. 3 and 3b.

Figure 4:
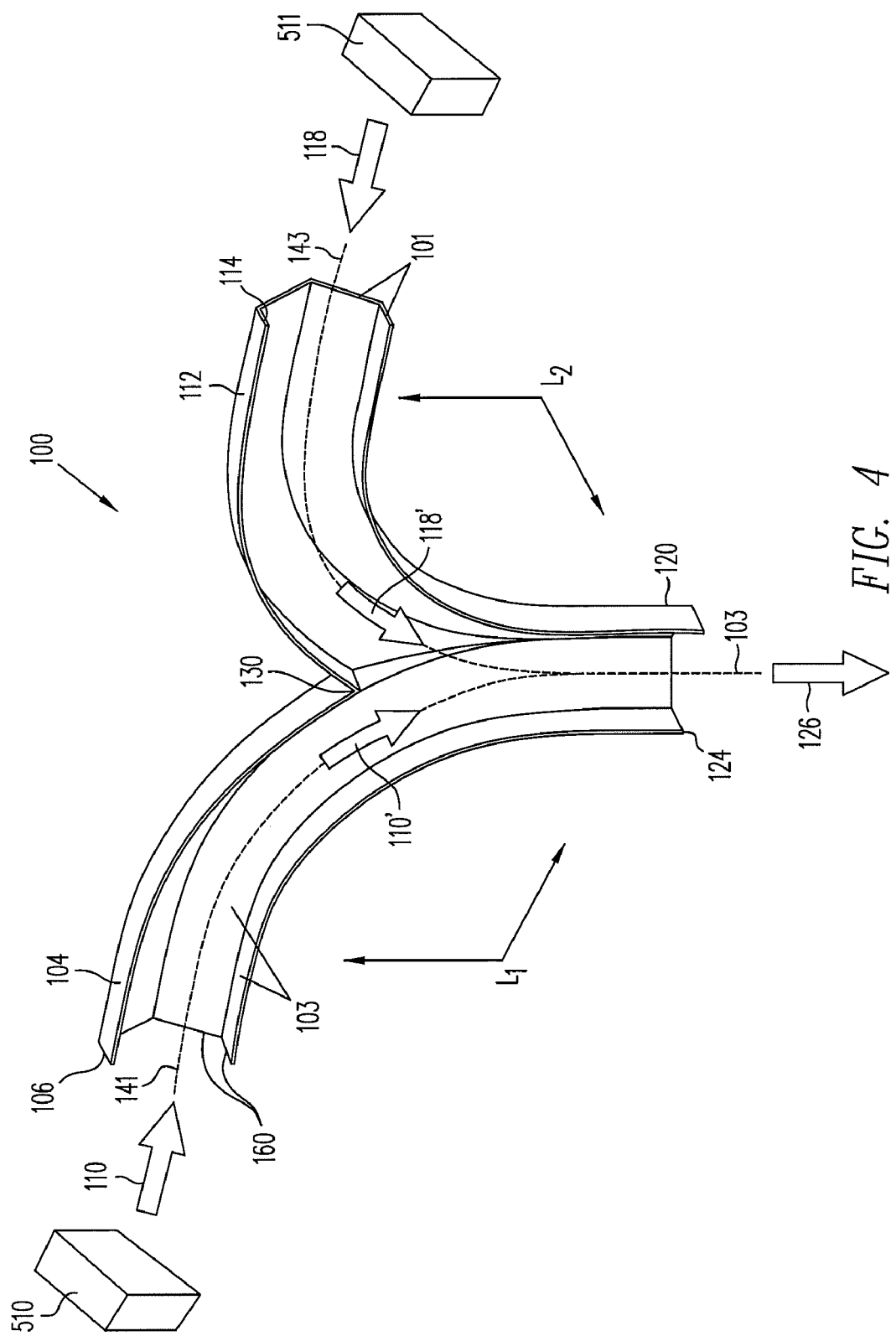
FIG. 4 illustrates an open, cross-sectional view of the light homogenizing and combining apparatus of FIG. 1.

FIG. 4 illustrates a view of an open cross-section of the LCHA 100 of FIG. 1. The tubular leg portions 104, 112 and 120 of body 102 may have polygonal cross-section shapes. They may also each have a plurality of side members 160 having highly reflective interior surfaces 103, so that light beams reflecting off an interior surface of these planar side members are reflected or folded over at least five times.

First input leg 104 and output leg 120 define a curved shape for which the geometric center of the polygonal cross-section of the curved shape defines a curve 141. Second leg 112 and third leg 120 define a curved shape, where the geometric center of the curved shape defines a curve 143. The curves 141 and 143 merge into the same curve at some point before or at the opening 124.

In an example embodiment, there is a distance L1 along the curve 141 from the opening 106 to the opening 124 and a distance L2 along the curve 143 from the opening 114 to the opening 124. The distances L1 and L2 may be sufficiently long to permit incoming light beams 110, 118 to reflect off the interior surfaces 103 of the side members 160 and be reflected or folded over at least five times before exiting the opening 124 as output beam 126.

In another embodiment, the distances L1 and L2 may be sufficiently long to permit the incoming light beams 110, 118 to reflect off an interior surface of the side members and be reflected or folded over at least five times, or be nearly completely homogenized, before being combined with each other and to permit the combined light beams to reflect off the interior surfaces of side members of the output leg and be reflected or folded over at least five times again before exiting as output beam 126.

In an example embodiment, the first and second input beams 110, 118 may have non-homogenized intensity profiles, for example Gaussian profiles. First input leg 104 may be configured to receive and reflect the first input light beam 110 to produce at least a partially homogenized beam 110' within the first leg 104 as first input light beam 110 is reflected by the highly reflective interior surfaces 103 of leg 104. Similarly, second input leg 112 may be configured to receive and reflect the second input light beam 118 to produce at least a partially homogenized input beam 118' within the second leg 112.

The first and second leg output beams 110' and 118' may be combined at a junction portion 130 of the LHCA 100. The combined, at least partially homogenized beams 110' and 118' may reflect on the highly reflective interior surfaces 103 of the second leg. The third leg 120 may provide an output beam 126 which may be a new single homogenized output beam 126. The intensity or amplitude of the output beam may be the sum of the plurality of input beams minus a negligible loss of about 5%. In addition, if the wavelengths (color) of the plurality of input beams are different from each other, then the output beam will have a new, derivative wavelength (color) so LHCA 100 may function as a wavelength blender. In this manner, LHCA 100 performs at least two functions that traditionally may require a minimum of three separate optical components. Therefore, LHCA 100 may provide homogenization and optical combining operations in a more compact, lower weight, and rugged manner while eliminating alignment requirements.

As used in this disclosure, homogenization includes a process of reflecting light off highly reflective interior surfaces of body 102 a minimum of five times in order to produce an output beam having a top hat profile. In one example, homogenization includes converting a smaller diameter light beam with a Gaussian intensity distribution into a larger diameter light beam with a top hat intensity distribution.

The term Gaussian, or the phrase Gaussian distribution, refers generally to a normal or bell-shaped spatial intensity distribution characterized by a location of higher intensity near the center of a region or cross-section that may fall off uniformly towards the sides of the region. In this case, the mode of the Gaussian curve corresponds to the center part of the input light beam. The phrase top hat, or top hat distribution, refers to a substantially equal spatial intensity distribution along the region or cross-section in a direction perpendicular to the output beam path. Additionally, the input light source may be composed of wavelengths corresponding to one specific color, a plurality of specific colors, or may comprise white light.

With reference again to FIG. 4, in an example embodiment, a desired combination of efficiency and beam quality may be achieved when the lengths L1 and L2 along the curves 141, 143 from the openings 106, 114, respectively, relate to the width W (see FIG. 6) of each leg 104, 112 and 120 with a ratio of approximately 6:1 (L:W). Where the lengths L1 and L2 and the width W have a ratio of approximately 6:1, the efficiency of the beam combining may be at a desirable efficiency, for example optimal homogenization at minimal cost. The desired or optimal efficiency may occur where a top hat profile is uniform to within excess of 98 percent of the optimum design. Stated differently, the measured intensity difference across the homogenized output beam may be uniform to within 2%. However, a range of L:W of about 5:1 to about 7:1 may also be acceptable. In a given embodiment, a designer may determine acceptable or desirable parameters for a given application. In an example embodiment, the width W may be in a range from about 4-6 mm or about one quarter of an inch. The lengths L1, L2 may be in a range from about 20-42 mm or about one and a half inches.

Light sources 510, 511 emit or conduct the input light beams 110, 118 having a Gaussian intensity distribution 218 (FIG. 5) and applied to openings 106, 114 of LHCA 100. Light beams 110, 118 may have cone patterns where the light may be applied to a substantially central portion of openings 106, 114 equidistant from each side of openings 106, 114, as illustrated, for example, in FIG. 5. Referring again to FIG. 4, light beams 110, 118 may then be applied to the highly reflective interior surfaces 103 of the LHCA 100. As the applied light beam travels down the lengths L1, L2, they undergo numerous reflections, combine at the junction 130 and emerge as an output beam having a top hat profile 318, 322 (FIG. 6) from an output end 124 of LHCA 100. During each of the reflections within an interior region of LHCA 100, the beam actually folds over onto itself resulting in the creation of a highly-uniform, homogenous top hat profile. After a minimum of five such reflections, the beam may be considered homogenous. The lengths L1, L2 may be, for example about 42 mm (millimeters) while the width (or diameter) of the legs 104, 112, 120 may be about 7 mm.

Figure 5:
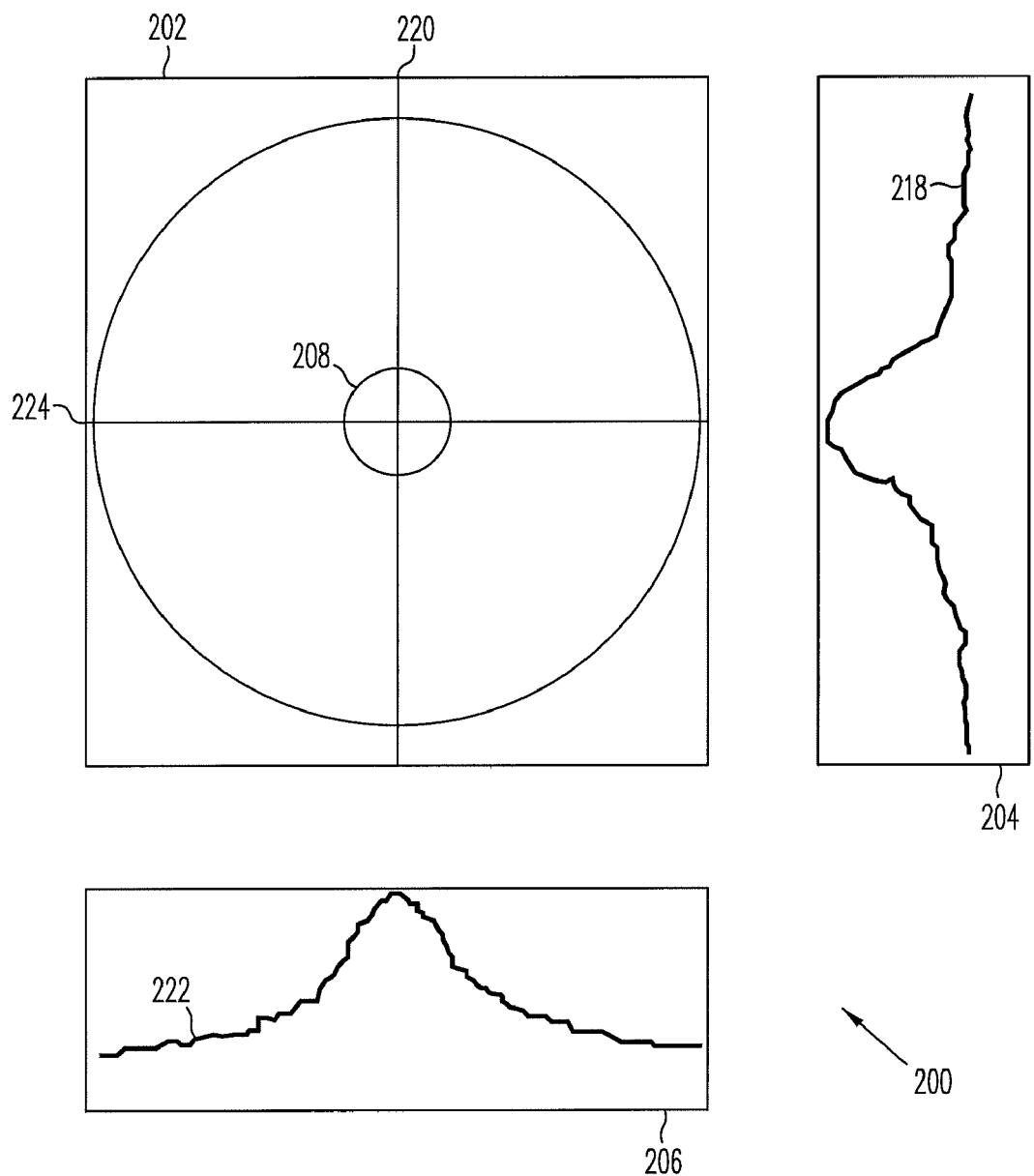
FIG. 5 illustrates a graphical intensity depiction including three plane views of an input Gaussian light beam, in accordance with an embodiment.

FIG. 5 shows a graphical intensity depiction 200 including three plane views (202, 204, 206) of an input Gaussian light beam 208, in accordance with an embodiment of the present invention. Depiction 200 includes a frontal plane view 202 showing a two-dimensional intensity distribution of an exemplary cross-section of the input Gaussian light beam 208, a profile plane view 204 showing a Gaussian distribution curve 218 depicting the intensity across a central vertical diameter 220 or span, and a horizontal plane view 206 showing a Gaussian distribution curve 222 depicting the intensity across a central horizontal diameter 224 or span.

As shown in FIG. 5, the light intensity profile varies across the diameter of the optical channel, in a direction perpendicular to the cross section of the channel, with a typical Gaussian intensity distribution. The light source may be a single point source such as a fiber optic cable, multiple point sources such as a fiber bundle, or an omni-directional source where only a portion of the emitted light from the source is received by the homogenizing and combining device. The wavelength of each light source may be monochromatic or polychromatic, coherent or incoherent.

Figure 6:
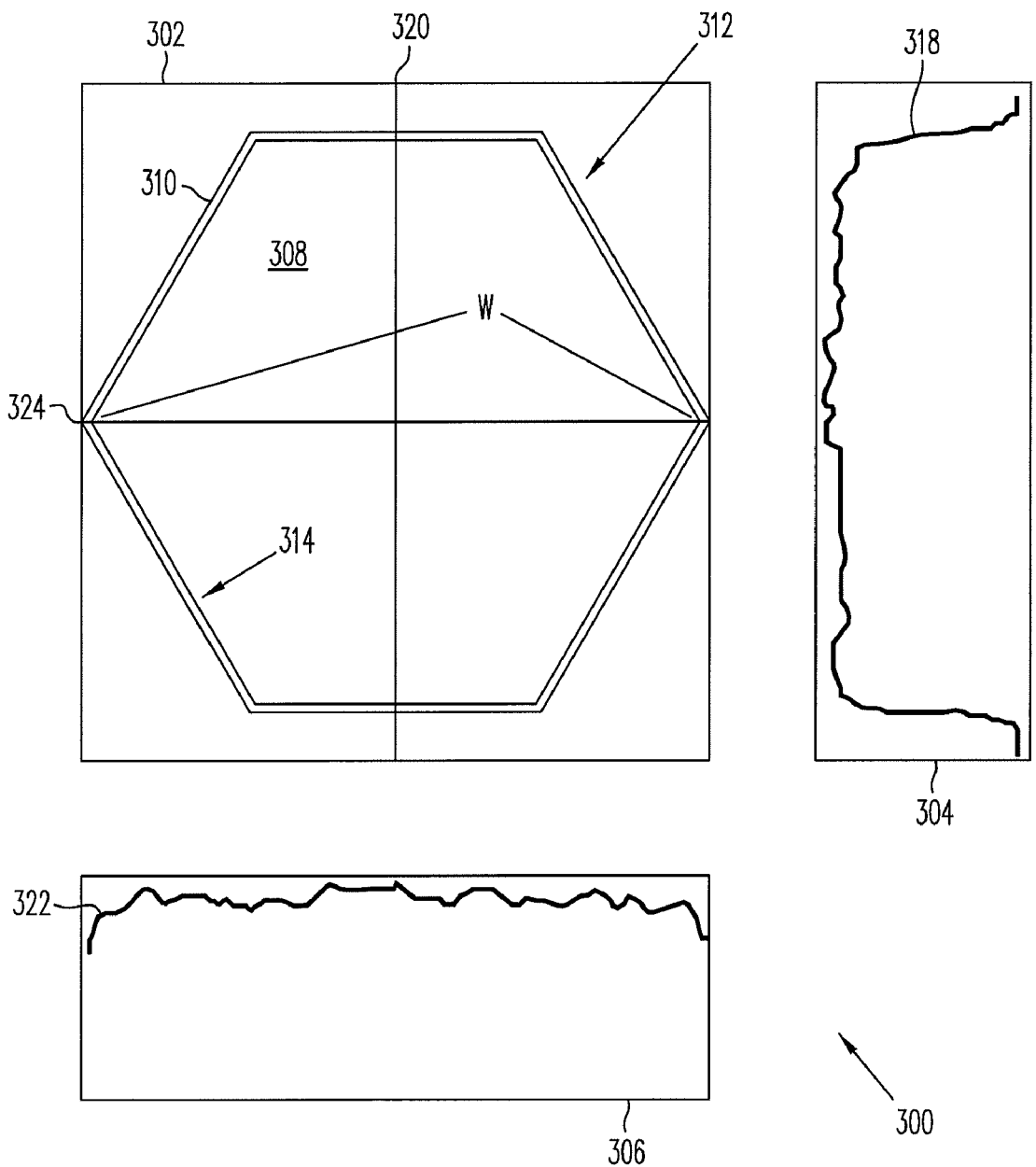
FIG. 6 illustrates a graphical intensity depiction including three plane views of an output top hat light beam from a tubular member having a hollow polygonal cross-section and a highly reflective interior surface, in accordance with an embodiment.

FIG. 6 shows a graphical intensity depiction 300 including three plane views (302, 304, 306) of an output top hat light beam 308 from a tubular member 310 having a hollow polygonal cross-section 312 and a highly reflective interior surface 314, in accordance with an embodiment of the present invention. In this example, the polygonal cross-section of tubular member 310 may be a hexagon comprising six, equal-size planar side members, but this is not considered limiting. Specifically, depiction 300 includes a frontal plane view 302 showing an end view of a tubular member having a two-dimensional intensity distribution for an exemplary cross-section of the output top hat light beam 308, a profile plane view 304 showing a top hat distribution curve 318 depicting the intensity across a central vertical diameter 320 or span, and a horizontal plane view 306 showing a top hat distribution curve 322 depicting the intensity across a central horizontal diameter 324 or span of the polygonal cross-section.

As shown in FIG. 6, the light intensity profile of output light beam 308 does not substantially vary across the diameter of the optical channel, in a direction perpendicular to the cross section of the channel, with a typical top hat intensity profile or distribution. The top hat intensity profile may be provided for all homogenized output light beams. This conversion to a top hat profile is important especially when LHCA 100 (FIGS. 1, 4) is used to project an output beam 308 (126 in FIGS. 1, 4) into a bundle of fibers. The homogenous nature of the output beam will assure that each individual fiber within the bundle will receive the same intensity of light. In this manner, the highly reflective interior surfaces 314 of tubular member 310 or body 102 (FIGS. 1, 4) may cause a light beam to fold over onto itself numerous times while passing through body 102, thus reshaping the original input Gaussian profile beam into a highly-uniform, homogenous top hat profile beam.

Input light beams 110, 118 (FIGS. 1, 4) may each be a point source of white light having a wavelength range from about 380 nm to 780 nm covering the spectrum of visible light. For visible light or for white light, a silver reflective surface within tubular body 102 will provide the highest efficiency. Alternatively, input light beams (110, 118) may include any light components above and/or below the visible spectrum. For this disclosure, white light may include a light beam that includes a plurality of wavelengths, and is thereby differentiated from single wavelength light beam having a particular color. In another example embodiment, the reflective surface within a tubular body 102 may be gold. Gold may provide a desired efficiency, for example, where the input light beams are in the infra-red region of the spectrum. Other materials may be used as desired depending on the wavelength of the input/output light.

The source of input light beams (110, 118) may be any light conductor or light emitter including a light conducting tubular member placed adjacent to or partially within an input end portion opening 106, 114 (FIGS. 1, 4), an output end portion of an optical cable such as a fiber-optic cable or bundle placed adjacent to or partially within an input end portion (106, 114), and/or a white light emitter such as an incandescent lamp, a fluorescent lamp, an Organic Light Emitting Diode (OLED), a chemical light source including a flame, the sun, and/or any other source of illumination directed toward, placed adjacent to, or partially within an input end portion (106, 114). The insertion distance partially within an input end portion (106, 114) may be up to about twice the diameter of an input light beam (110, 118) through an insertion plane that may be parallel to an outer edge of planar input end portions (106, 114).

Figure 7:
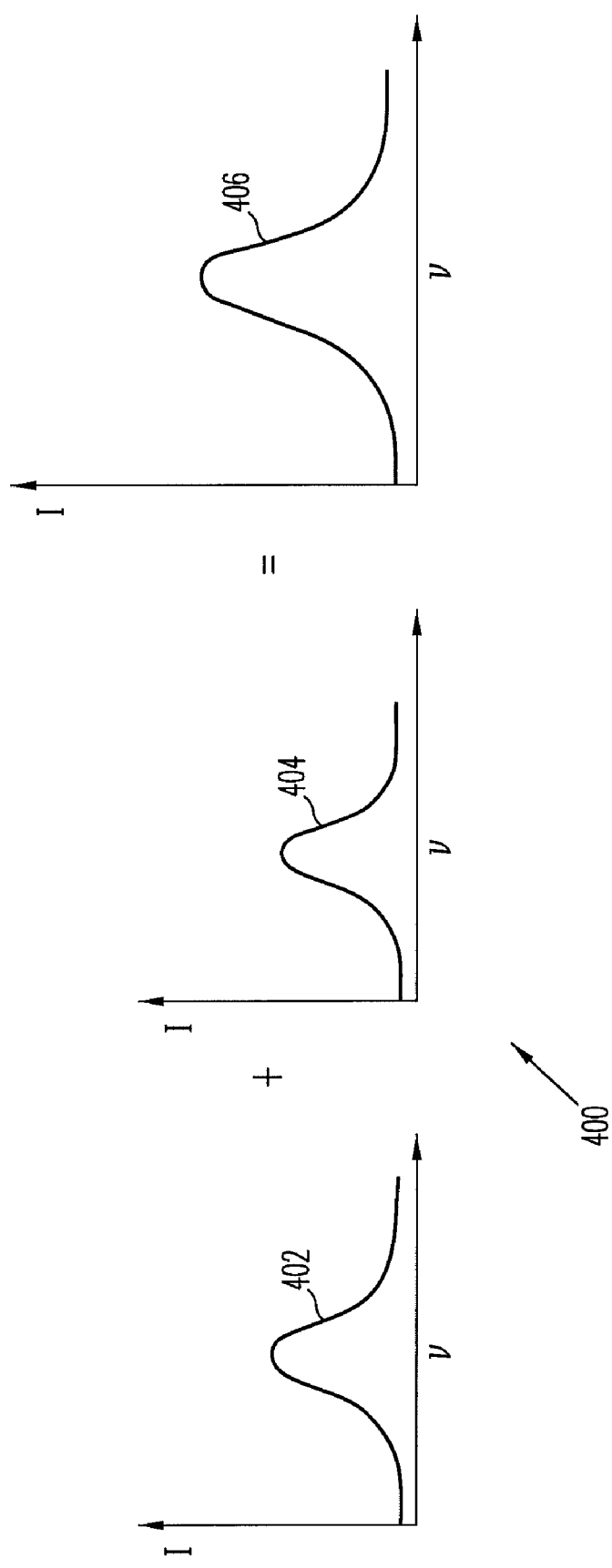
FIG. 7 illustrates a graphical sum illustrating an exemplary combination of a first input beam and a second input beam, where a combined output beam has an intensity that is the sum of the intensities of the input beams, in accordance with an embodiment.

FIG. 7 shows a graphical sum 400 illustrating an exemplary combination of a first input beam 402 and a second input beam 404, where a combined output beam 406 has an intensity that is the sum of the intensities of the input beams (402, 404), according to an embodiment of the present invention. When the input beams are of different wavelengths (i.e. are of different colors) the output beam will be of a third wavelength that is a combination of the input wavelengths. In this manner, a homogenized output beam having a third color may be generated (color generator) based on two Gaussian input beams having two different colors.

Figure 8:
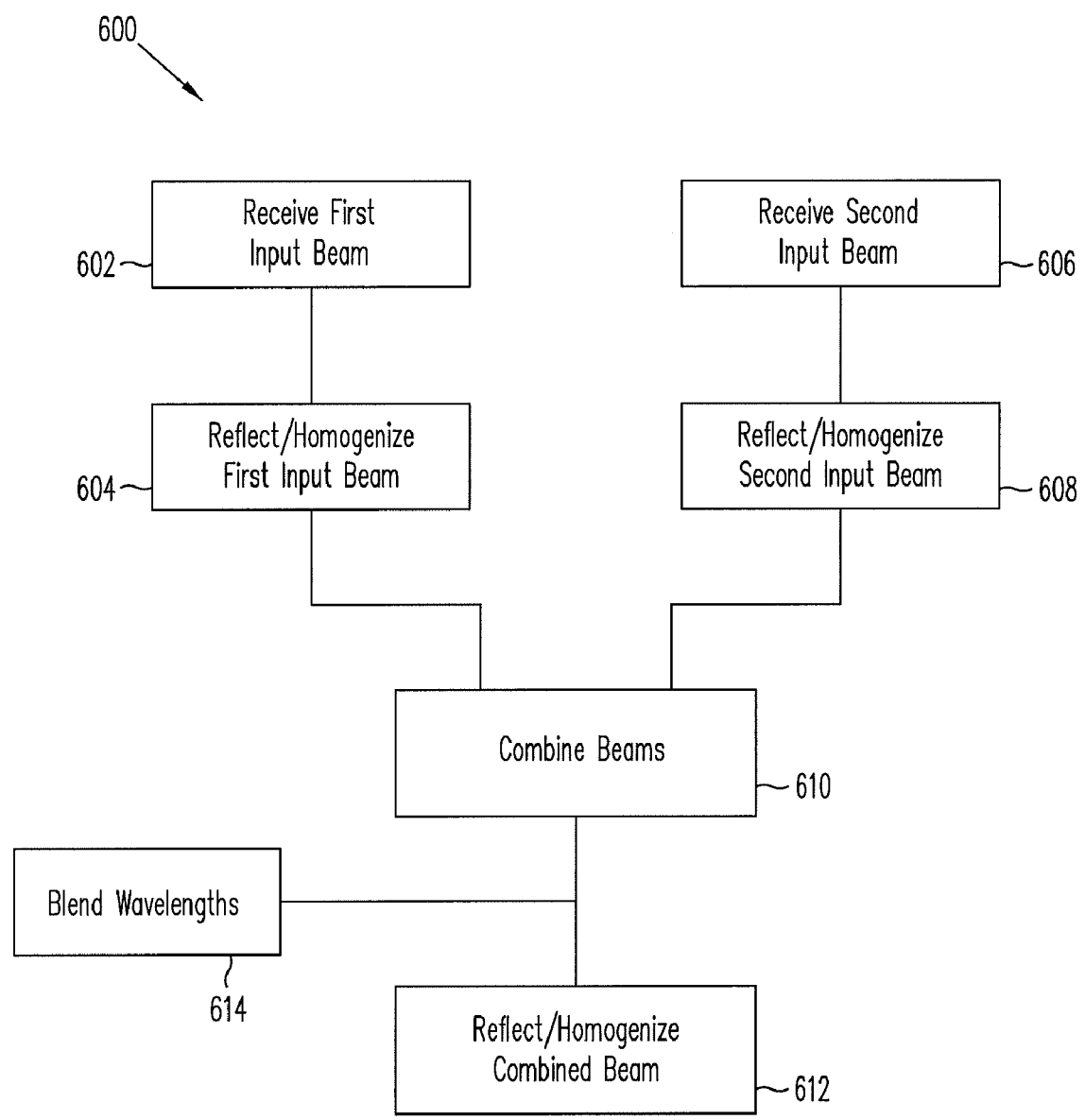
FIG. 8 illustrates an exemplary embodiment of a method of using an exemplary embodiment of a light homogenizing and combining apparatus.

FIG. 8 illustrates a method 600 of using a light homogenizing and combining apparatus, according to an embodiment of the present invention. In an example embodiment, input light beams 110, 118 (FIG. 4) are received 602, 606 in first and second input legs 104, 112 (FIG. 4), respectively. The input light beams 110, 118 may have Gaussian intensity profiles 218, 222 (FIG. 5). In an example embodiment, the light beams 110, 118 may be emitted from a light sources 510, 511 (FIG. 4), for example fiber optic cables, and be applied to input openings 106, 114 (FIG. 4), respectively. The input light beams 110, 118 may be reflected within the legs 104, 112 to produce 604, 608 first and second leg output beams 110', 118'. In this manner, the Gaussian first input light beams may be reshaped into at least partially homogenized top hat profile beams after repeated reflections from the inside surfaces of tubular body 102 (FIG. 4). In an example embodiment, the first and second leg output beams 110', 118' may be homogenized, for example completely homogenized in the first and second legs.

In an example embodiment, the at least partially homogenized beams 110', 118' may be combined 610 in the output leg 120 (FIG. 4) of the tubular body 102. The combined beam may be reflected and homogenized 612 within the output leg 120 to produce a combined homogenized output beam 126 at the output opening 124 (FIG. 4). In this manner, combined homogenized output beam 126 or 406 (FIG. 7) may have a top hat profile and amplitude that is nearly the sum of the amplitudes of the input beams. Further, when the input beams (110, 118) have different wavelengths, the combined beams may be blended 614 so that the output beam 126 has a new color that is a combination of the wavelengths present in the input beams.

Although an exemplary embodiment of the method 600 shows a combination of two Gaussian light sources, this process may be utilized for three or more input beams, where the transmitted beam from a prior homogenization and combination stage (i.e. a first LHCA 100) may be asserted to a latter homogenization and combination stage (i.e. a second LHCA 100) so that more than two input beams may be homogenized and combined to produce a top hat profile output beam that is a combination of all input beams.

In an example embodiment, the overall system will have an efficiency of at least 92.5 percent, for example greater than 93 percent.

Figure 9:
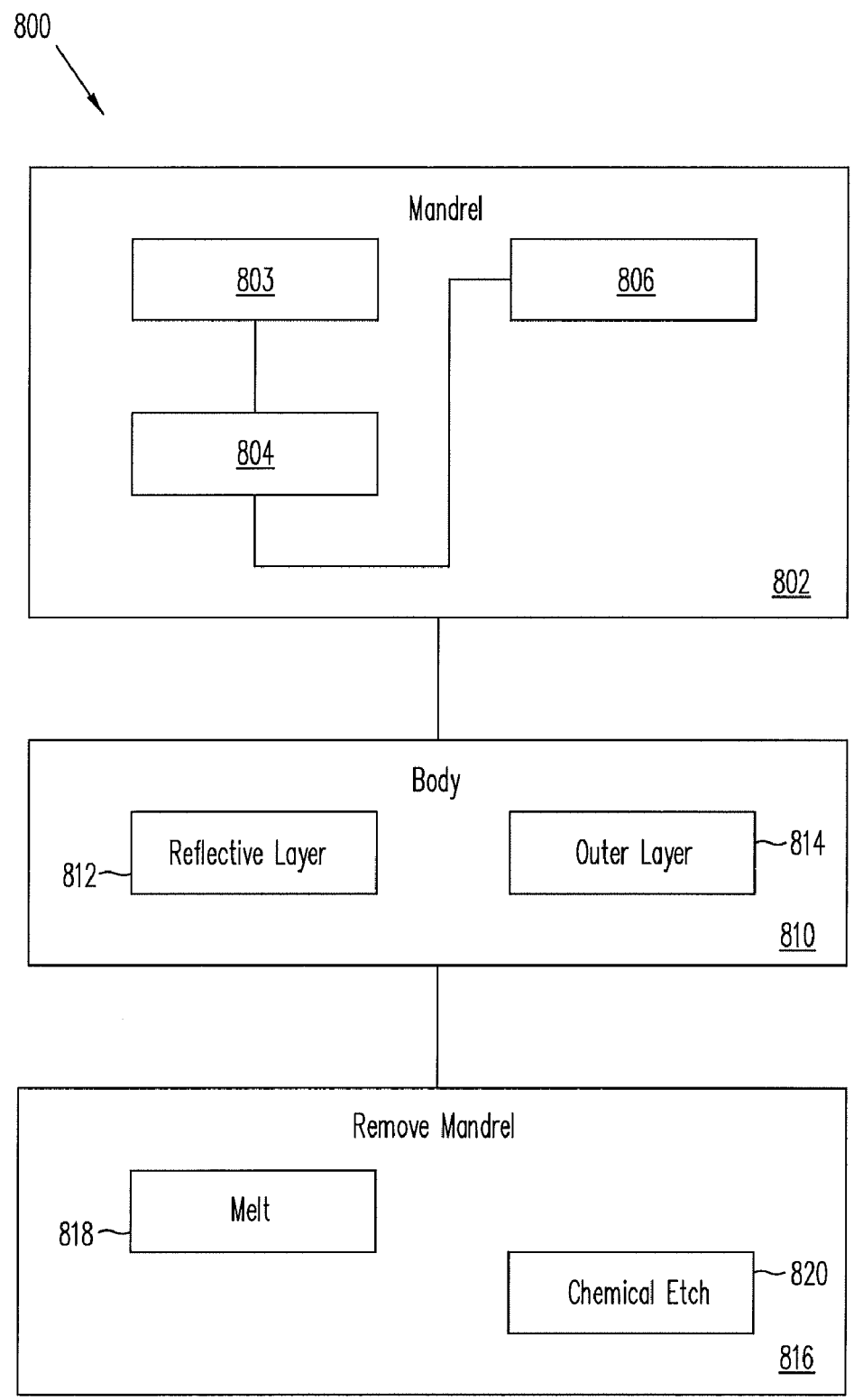
FIG. 9 illustrates an exemplary embodiment of a method of fabricating a light combining and homogenizing apparatus in accordance with an embodiment of this disclosure.

FIG. 9 illustrates an exemplary method 800 of fabricating an LHCA 100. In one embodiment, a body 102 (FIG. 1) may be fabricated in an electroplating or electroforming process 800 using a shaped form or mandrel, the exterior shape of the mandrel corresponding to the shape of interior reflective surfaces of the LHCA to be formed. The method may include providing 802 the mandrel. The mandrel may be formed from a material onto which a metal which can provide a highly reflective interior surface may be electroplated. For example, the mandrel may be formed from material which is metal, for example aluminum. The melting point of the material from which the mandrel is formed may have a lower melting point than the metal used to form the body 102.

The mandrel may be provided 802 or formed by any process of casting, forming, injection molding or tooling to provide a non-metal mandrel 803 with the desired shape to provide a desired shape of the interior surfaces. In an example embodiment, the mandrel may be formed in a die by injection molding. The form may be, for example, wax. Aluminum may be deposited 804 on the form and the form melted away 806. The resulting aluminum mandrel may be used for fabricating the body of the LCHA.

Figure 10:
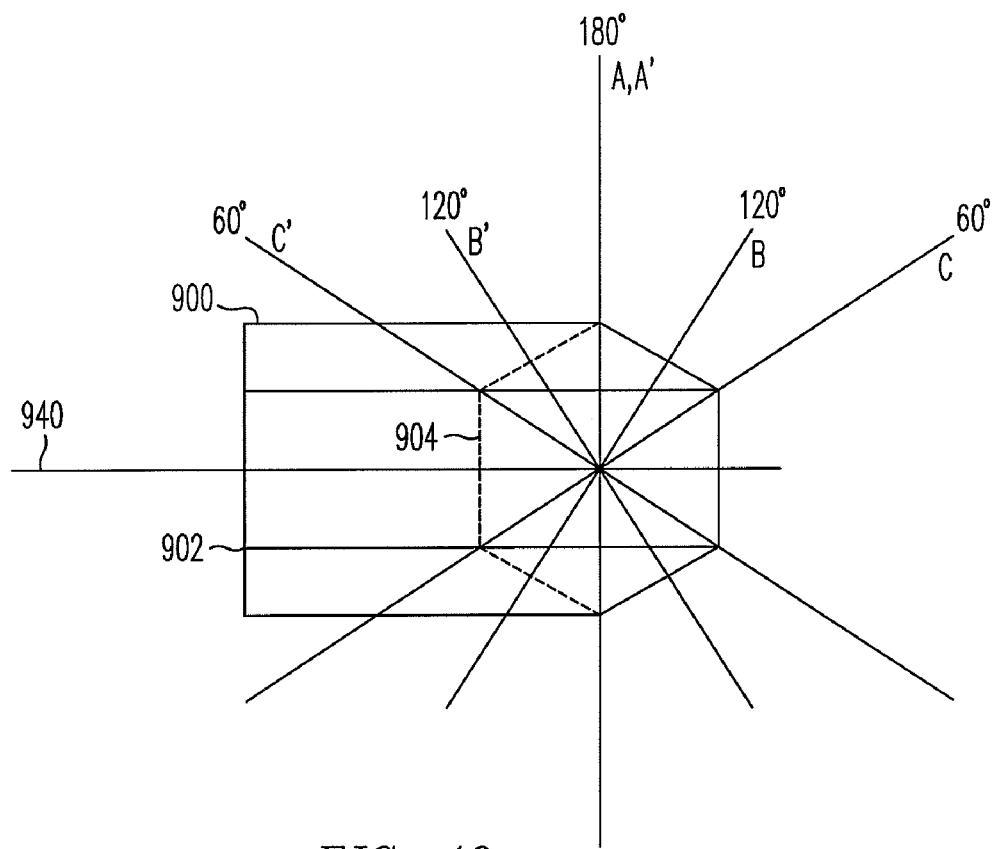
FIG. 10 illustrates an overhead view of an exemplary embodiment of a bent polygonal rod shape for used in the fabrication of a light combining and homogenizing apparatus.

FIG. 10 illustrates an overhead view of a bent rod shape 900. The bent rod shape has a first end 902, corresponding to an opening of a first or second leg of an LHCA. The shape has a second end 904 corresponding to an exit opening of an LHCA. In the embodiment shown in FIG. 10, the rod shape 900 is bent at a 90 degree angle with an axis 940 of the first end 902 being at about 90 degrees with respect to an axis of the second end.

Figure 3A:
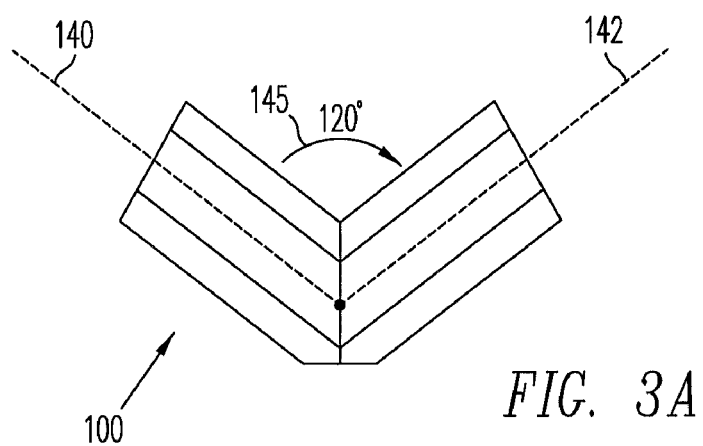
FIG. 3A illustrates an overhead view of the light homogenizing and combining apparatus of FIG. 3.

In an example embodiment, the shape may be truncated along any plane that bisects the end portion of the rod shape corresponding to the output beam opening 904. Two rod shapes truncated along the plane A, A' may be placed together to form a mandrel corresponding to the LHCA of FIG. 1. In an example embodiment, the two bent rod shapes truncated along the planes B, B' may be joined together to form the shape of a mandrel corresponding the LHCA of FIG. 3A with an angle 145 of 120 degrees between the axes 140 and 142 with respect to the axis 144. Two bent rod shapes truncated along the plance C, C' may be placed together to form a mandrel corresponding to an LHCA in which the angle 145 is 60 degrees (not shown). For shapes having other polygonal cross-sections, other angles may be achieved.

Referring again to FIG. 9, in an example embodiment, the body may be plated 810 onto the mandrel to build up a "stand alone" thickness where the highly reflective interior surface plating surrounding the mandrel is structurally self-supporting. In one embodiment, plating 810 the body onto the mandrel may include coating 812 the aluminum form or mandrel with a highly reflective layer corresponding to the highly reflective interior surface of an LHCA to be formed. The highly reflective layer may include, for example, silver, gold, or other highly reflective plating material. The highly reflective layer may then be coated 814 with an outer layer. The outer layer may be a stronger material, for example nickel, that may bond with and/or structurally support the highly reflective plating to provide structural rigidity for the body having a highly reflective interior surface. The highly reflective layer may be very thin because the majority of structural support for body is provided by an outer plating layer.

In an exemplary embodiment, the highly reflective layer may only be a few atomic layers thick while the outer layer may be composed of nickel that may be approximately 0.002-inches thick. The thickness of the outer layer may be determined by the properties of the selected material and the rigidity requirements of a particular mission or application. By reducing the thickness of the highly reflective layer, the cost of the manufactured device may be kept low when the highly reflective material layer may be composed of silver, gold, or other precious metal. Generally, the composition of the highly reflective material depends upon the wavelength of light being reflected within the tubular member being formed. In one preferred embodiment, the highly reflective material layer is composed of silver to reflect white light with maximum efficiency.

The mandrel may then be removed 816, for example by melting 818, chemically etching 820, and/or exploiting some other property such as a difference between the thermal coefficients of expansion between the mandrel and the plating in order to remove the mandrel and form body. Once the outer layer is formed, the aluminum form or mandrel may then be chemically melted away leaving the highly reflective, or highly polished, interior surface within body 102.

In an example embodiment, light combining and homogenizing apparatuses according to the disclosure may solve several problems without the use of any optical or glass elements such as beamsplitters, mirrors and the like. The LCHA may convert Gaussian profile input light beams to a highly homogeneous, top hat profile beam. It may combine the intensity of each initial light beam into a new single higher intensity output beam. It may also be used to combine two beams of different wavelengths (colors) into a new single output beam with a totally different wavelength (color). In this mode, the LCHA may act as a wavelength/color generator, enabling the operator to generate a new colored light beam depending strictly upon the wavelength (color) of the two initial light sources. A LCHA according to the disclosure may not require initial alignment steps and may therefore be less susceptible to misalignment and possible optical contamination than other approaches. An LCHA according to an embodiment of the disclosure may avoid the costs of additional hardware or components of other approaches and may be smaller and more compact. It may also avoid intensity losses that may occur in the multiple optical elements used in other approaches.

Embodiments described above illustrate but do not limit the invention. It should also be understood that numerous modifications and variations are possible in accordance with the principles of the present invention. Accordingly, the scope of the invention is defined only by the following claims.

We claim:

1. An optical homogenizing and combining apparatus, comprising:
   a one piece, hollow, tubular body having a first input leg, a second input leg and an output leg, each leg having a polygonal cross-section and highly reflective interior surfaces; and
   wherein the body has a shape corresponding to first and second bent tubes, the tubes being truncated along a plane and joined at a junction lying in the plane, wherein a first end of the first tube defines the first input leg, a first end of the second tube defines the second input leg, and a second end of the first tube and a second end of the second tube define the output leg.

2. The optical homogenizing and combining apparatus of claim 1, wherein the body is symmetric with respect to the plane of truncation.

3. The optical homogenizing and combining apparatus of claim 1, wherein the interior surface comprises one of silver or gold.

4. The optical homogenizing and combining apparatus of claim 3, wherein the exterior layer comprises nickel.

5. The optical homogenizing and combining apparatus of claim 1, wherein the body comprises an exterior layer to provide structural rigidity.

6. The optical homogenizing and combining apparatus of claim 1, wherein the body comprises an interior surface comprising one of silver or gold and comprises an exterior layer comprising nickel.

7. The optical homogenizing and combining apparatus of claim 1, further comprising a first and second plurality of continuous panels and a first and second plurality of junction panels, wherein;
   the first plurality of continuous panels and first plurality of junction panels define the first input leg;
   the second plurality of continuous panels and second plurality of junction panels define the second input leg;
   the first and second plurality of continuous panels define the output leg.

8. The optical homogenizing and combining apparatus of claim 7, wherein the first and second plurality of junction panels comprise edges that defining the junction.

9. The optical homogenizing and combining apparatus of claim 1, wherein the polygonal cross-section has a width W and a curve through an interior of the body from the first input opening to the output opening has a length L1, wherein the ratio L1:W is in a range from about five to one to seven to one.

10. The optical homogenizing and combining apparatus of claim 9, wherein the ratio L1:W is about six to one.

11. A method of forming a light combining and homogenizing apparatus, comprising:
    forming a mandrel, wherein the mandrel has a shape corresponding to two symmetrical, bent, truncated polygonal rods joined at a planar truncation face;
    depositing a body on lateral surfaces of the mandrel; and
    removing the mandrel from an interior of the body.

12. The method of claim 11, wherein depositing the body on the lateral surfaces of the mandrel comprises depositing a first layer comprising a highly reflective material and then depositing a second layer over the first layer, the second layer being thicker than the first layer.

13. The method of claim 12, wherein the first layer comprises at least one of gold or silver and the second layer comprises nickel.

14. The method of claim 12, wherein the first layer has a thickness on the order of a few atomic layers and the second layer has a thickness of about 0.002 inch.

15. The method of claim 12, wherein the mandrel comprises a first material and the body comprises a second material, the first material having a first melting point lower than a second melting point of the second material; wherein removing the mandrel comprises removing the first material to form a light combining and homogenizing apparatus comprising a one piece, hollow, tubular body having a first input leg, a second input leg and an output leg, each leg having a polygonal cross-section of a regular hexagon.

16. The method of claim 11, wherein removing the mandrel comprises chemically etching the mandrel.

17. The method of claim 11, wherein depositing the body comprises depositing a first layer comprising highly reflective material and depositing a thicker, second layer to provide structural support to the body and wherein removing the mandrel comprises one of melting or chemically etching the mandrel.

18. A light combining and homogenizing apparatus, comprising:

a first curved, hex-shaped input leg having a first input opening at one end and a first junction edge at a second end;

a second curved, hex-shaped input leg having a second input opening at one end and a second junction edge at a second end, wherein the first and second input legs are joined at the first and second junction edges;

a hex-shaped output leg connected to the first and second input legs; and wherein the first input leg, the second input leg and the output leg have highly reflective interior surfaces, wherein a first input beam received at the first input opening and a second input beam received at the second input opening are homogenized and combined into an output beam emitted from the output opening and having an intensity equal to about the sum of intensities of the first and second input beams and having a top hat profile.

19. The light combining and homogenizing apparatus of claim 18, wherein the first and second input beams have first and second colors, respectively, and the output beam has a third color that is different from the first and second colors.

20. The light combining and homogenizing apparatus of claim 18, wherein the highly reflective interior surfaces comprise silver for use with input beams comprising visible light or comprise gold for use with input beams comprising infrared radiation.

* * * * *